United States Patent [19]

Yamada et al.

[11] Patent Number: 5,379,121
[45] Date of Patent: Jan. 3, 1995

[54] PORTABLE FACSIMILE APPARATUS

[75] Inventors: Masakatsu Yamada, Kawasaki; Minoru Yokoyama, Yokohama; Toshio Kenmochi, Yokohama; Yosuke Ezumi, Yokohama; Hisashi Toyoda, Yokohama; Hideyuki Terashima, Sagamihara, all of Japan

[73] Assignee: Canon Kabushiki Kaisha, Tokyo, Japan

[21] Appl. No.: 3,030

[22] Filed: Jan. 11, 1993

[30] Foreign Application Priority Data

Jan. 14, 1992 [JP] Japan .................................. 4-004567
Jan. 14, 1992 [JP] Japan .................................. 4-004568
Jan. 14, 1992 [JP] Japan .................................. 4-004569

[51] Int. Cl.⁶ .................. H04N 1/00; H04N 1/04; H04N 1/23
[52] U.S. Cl. .................. 358/400; 358/496; 358/498; 358/296; 358/473
[58] Field of Search ............. 358/296, 496, 498, 473, 358/400, 494, 474

[56] References Cited

U.S. PATENT DOCUMENTS 4,143,417  3/1979  Wald et al. .
5,014,135  5/1991  Ijuin et al. .................. 358/296
5,153,738 10/1992  Stemmle .................... 358/296
5,206,745  4/1993  Yamada et al. ............. 358/498

FOREIGN PATENT DOCUMENTS 0288241 10/1988  European Pat. Off. .
0297566  1/1989  European Pat. Off. .
0361459  4/1990  European Pat. Off. .
60-106272  6/1985  Japan .

Primary Examiner—Scott A. Rogers
Attorney, Agent, or Firm—Fitzpatrick, Cella, Harper & Scinto

[57] ABSTRACT

A facsimile apparatus comprises a housing constituting the outer surface of the facsimile apparatus, an original reading section for conveying an original between a first opening portion formed in a front portion of the upper surface of the housing and a front surface opening portion formed in the front surface of the housing, and a recording section for inserting a recording sheet through a second opening portion formed in the upper surface of the housing at a position closer to the rear side than the first opening portion and for discharging the recording sheet through the first opening portion. A cut sheet can be inserted/discharged through each opening portion. Since the first opening portion is commonly used for both an original and a recording sheet, the depth of the housing can be reduced. In addition, the housing can be designed to be flat and compact so as to be easily carried. The apparatus further includes a storage portion for a battery detachably set through a side surface on the rear side of the housing. A cut sheet can be inserted/discharged through each opening portion. Since the first opening portion is commonly used for both an original and a recording sheet, the depth of the housing can be reduced. In addition, the housing can be designed to be flat and compact so as to be easily carried. Furthermore, the apparatus can be used in a place where no commercial power supply is available, by receiving power from a battery.

19 Claims, 11 Drawing Sheets

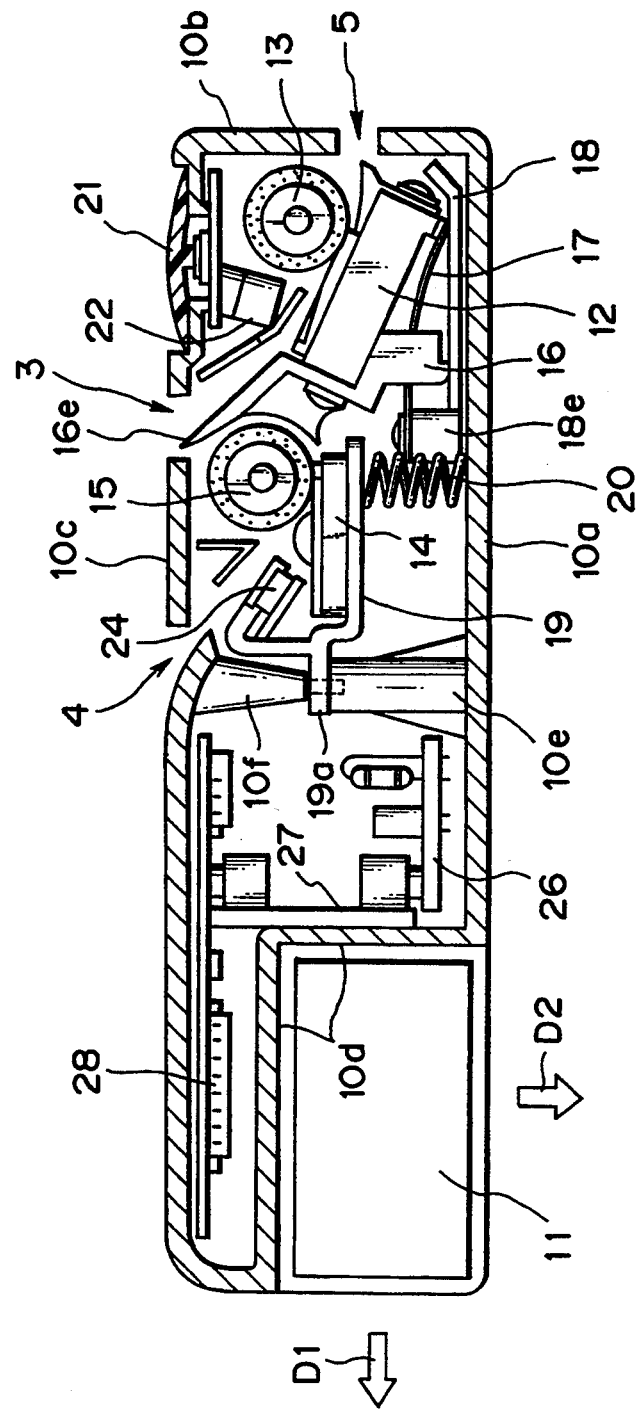

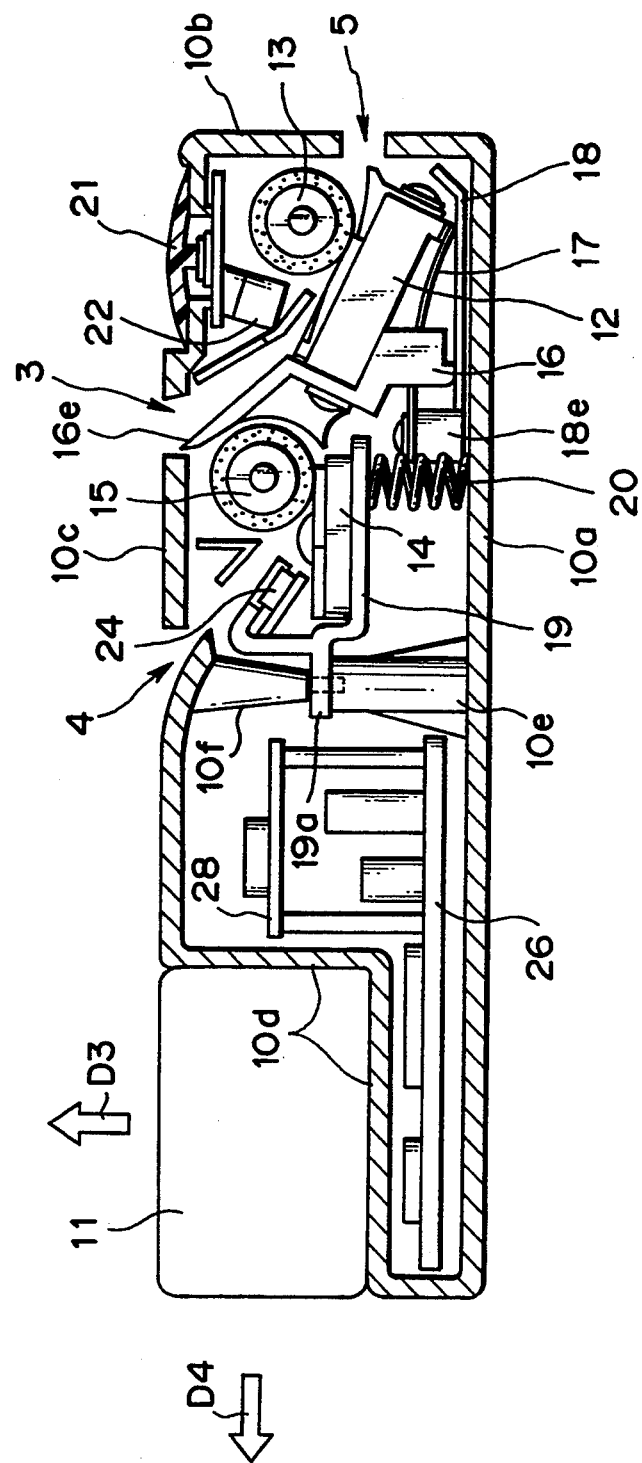

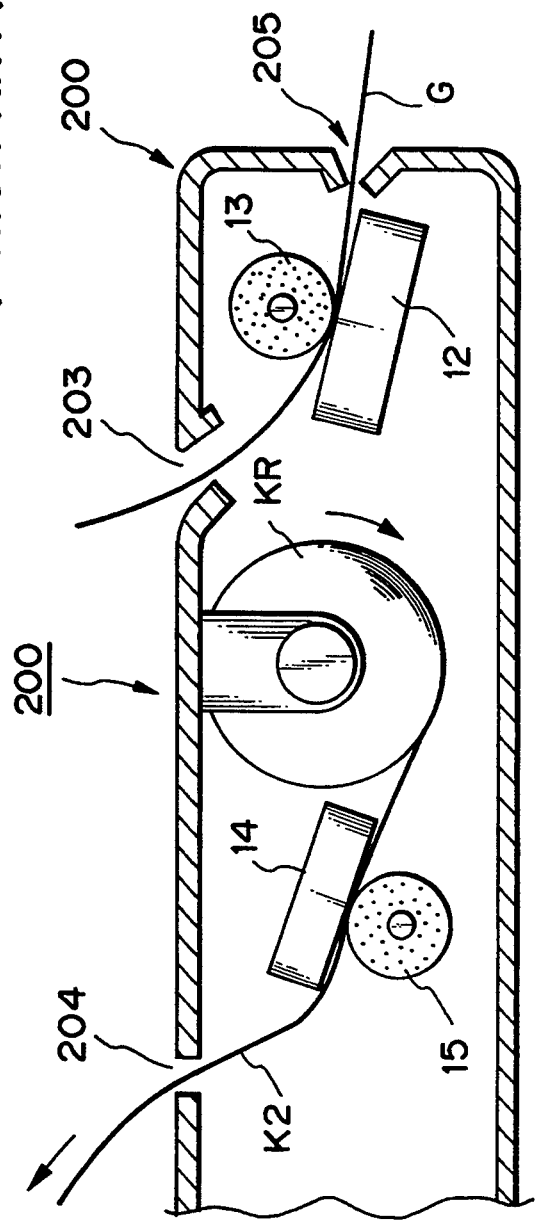

PORTABLE FACSIMILE APPARATUS

BACKGROUND OF THE INVENTION

The present invention relates to a facsimile apparatus and, more particularly, to a flat, compact, low-profile facsimile apparatus.

A compact facsimile apparatus has been conventionally proposed. The arrangement of the recording and originall reading sections of such a facsimile apparatus will be briefly described below with reference to FIG. 11.

FIG. 11 is a cross-sectional view of the conventional facsimile apparatus, which is considered to have the most compact, flattest structure at present. Referring to FIG. 11, a first opening portion 203 is formed in the upper surface of a housing cover 200, which also serves as a housing, at a position near an edge portion thereof. A second opening portion 204 is formed in the upper surface of the housing cover 200 at a backward position (on the rear surface side) with respect to the first opening portion 203. In addition, a discharge port 205 is formed in the front surface of the housing cover 200.

In the above arrangement, an original G is inserted, with its image surface facing down, through the first opening portion 203. The inserted original G is clamped between a contact line image sensor 12 and a first biasing roller 13 which is pivoted in a biased state with respect to the contact line image sensor 12. The original G is then conveyed and discharged from the discharge port 205.

On the inner surface of the upper wall of the housing cover 200, as shown in FIG. 11, a roll-like recording paper KR, which is a roll of thermal recording paper, is held to be movable in a direction of an arrow and replaceable. The color development surface of roll paper K2 is set to oppose the recording portion of a line thermal head 14 constituting the recording section. At the same time, the roll paper K2 is clamped between the line thermal head 14 and a second biasing roller 15 which is pivoted in a biased state with respect to the line thermal head 14, and is discharged outside through the second opening portion 204 after a recording operation.

With the above-described arrangement, the reading portion and the recording portion are prevented from overlapping each other in the direction of height, thereby reducing the height of the housing cover 200.

In the above-described facsimile apparatus, however, in order to reduce the height of the housing, roll-like recording paper (KR) is disposed between the reading and recording sections. As a result, the housing requires at least a space, as an extra depth, for storing the roll-like recording paper (KR). Therefore, a further reduction in the depth of the housing cannot be achieved.

In addition, since the above facsimile apparatus is designed to use only roll-like recording paper (KR), a so-called cut sheet consisting of thermal recording paper, e.g., an A4 size sheet, cannot be set in the recording section. More specifically, in order to set such a cut sheet in the recording section, a cumbersome operation is required. For example, a cut sheet may be set after roll-like recording paper is removed. Therefore, it is practically impossible to set a cut sheet in the recording section. If an opening portion specially designed for the insertion of a cut sheet is to be formed, for example, near the above-mentioned first opening portion, the strength of a bar-like partition portion formed between the first opening portion and the opening portion having a longitudinal size larger than at least the width of an A4 size sheet cannot be guaranteed. In practice, therefore, setting of a cut sheet cannot be performed.

Furthermore, according to the above facsimile apparatus, since driving motors are respectively arranged for the first and second biasing rollers, the power consumption during a driving operation of each roller is large, and the number of components is undesirably increased.

SUMMARY OF THE INVENTION

It is the first object of the present invention to provide a facsimile apparatus which allows the use of a cut sheet, can reduce the depth of a housing, and can be designed to be compact and small to be easily carried.

In addition to the first object, it is the second object of the present invention to provide a facsimile apparatus which can be used in any place, e.g., outdoors.

In addition to the first object, it is the third object of the present invention to provide a facsimile apparatus which uses a common driving source for drive rollers used for an original and a recording sheet to reduce the power consumption, can realize a reduction in cost by decreasing the number of components, and can achieve a reduction in weight.

It is the fourth object of the present invention to provide a facsimile apparatus which can achieve the first, second, and third objects.

In order to solve the above-described problems and achieve the above objects, a facsimile apparatus of the present invention has the following arrangements.

According to the present invention, there is provided a facsimile apparatus comprising a housing constituting an outer surface of the facsimile apparatus, an original reading section for conveying an original between a first opening portion formed in a front portion of an upper surface of the housing and a front surface opening portion formed in a front surface of the housing, and a recording section for inserting a recording sheet through a second opening portion formed in the upper surface of the housing at a position closer to a rear side than the first opening portion and for discharging the recording sheet through the first opening portion. A cut sheet can be inserted/discharged through each opening portion. Since the first opening portion is commonly used for both an original and a recording sheet, the depth of the housing can be reduced. In addition, the housing can be designed to be flat and compact so as to be easily carried.

Preferably, there is provided a facsimile apparatus comprising a housing constituting an outer surface of the facsimile apparatus, an original reading section for conveying an original between a first opening portion formed in a front portion of an upper surface of the housing and a front surface opening portion formed in a front surface of the housing, a recording section for inserting a recording sheet through a second opening portion formed in the upper surface of the housing at a position closer to a rear side than the first opening portion and for discharging the recording sheet through the first opening portion, a control section arranged on a rear side of the recording section, and a storage portion for a battery detachably set through a side surface on the rear side of the housing. A cut sheet can be inserted/discharged through each opening portion. Since the first opening portion is commonly used for both an original and a recording sheet, the depth of the housing can be reduced. In addition, the housing can be designed to be flat and compact so as to be easily carried. Furthermore, the apparatus can be used in a place where no commercial power supply is available, by receiving power from a battery.

In addition, there is preferably provided a facsimile apparatus comprising a housing constituting an outer surface of the facsimile apparatus, an original reading section for conveying an original between a first opening portion formed in a front portion of an upper surface of the housing and a front surface opening portion formed in a front surface of the housing, and a recording section for inserting a recording sheet through a second opening portion formed in the upper surface of the housing at a position closer to a rear side than the first opening portion and for discharging the recording sheet through the first opening portion, wherein a reversible motor is used as the driving means, and a power transmitting section is arranged midway along a power transmission mechanism for the first convey roller, the power transmitting section driving one of the first and second rollers when the motor is driven in one direction, and driving both of the first and second convey rollers when the motor is rotated in a reverse direction. With this arrangement, the power consumption can be reduced, and the number of components of the mechanical portion of the facsimile apparatus can be decreased, thereby achieving a reduction in cost.

Furthermore, there is preferably provided a facsimile apparatus having at least a minimum function required for a facsimile apparatus, comprising a flat, compact housing constituting an outer surface of the facsimile apparatus, an original reading section for conveying an original between a first opening portion formed in a front portion of an upper surface of the housing and a front surface opening portion formed in a front surface of the housing, and a recording section for inserting a recording sheet through a second opening portion formed in the upper surface of the housing at a position closer to a rear side than the first opening portion and for discharging the recording sheet through the first opening portion, wherein the original reading section is constituted by a contact line image sensor and a first convey roller which is pivoted/driven while the contact line image sensor is biased, the recording section is constituted by a line thermal head and a second convey roller which is pivoted/driven while the line thermal head is biased in order to use a thermal recording sheet as the recording sheet, and the apparatus further comprises a control section arranged at a rear side of the recording section, and a storage portion for a battery detachably set through a side surface on the rear side of the housing. A cut sheet can be inserted/discharged through each opening portion. Since the first opening portion is commonly used for both an original and a recording sheet, the depth of the housing can be reduced. In addition, the housing can be designed to be flat and compact so as to be easily carried. Furthermore, the apparatus can be used in a place where no commercial power supply is available, by receiving power from a battery. With this arrangement, the power consumption can be reduced, and the number of components of the mechanical portion of the facsimile apparatus can be decreased, thereby achieving a reduction in cost.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 is a cross-sectional view of the apparatus in FIGS. 1A and 1B;

FIG. 3 is a cross-sectional view of a low-profile facsimile apparatus according to the second embodiment of the present invention;

FIG. 11 is a cross-sectional view of a conventional facsimile apparatus.

DETAILED DESCRIPTION OF THE PREFERRED EMBODIMENTS

Figure 1A:
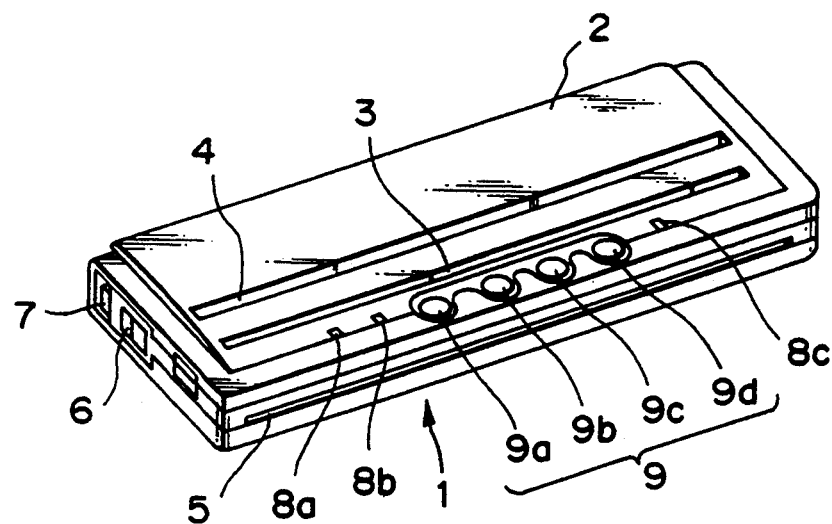
FIG. 1A is a perspective view showing the outer appearance of a low-profile facsimile apparatus according to the first embodiment of the present invention.
Figure 1B:
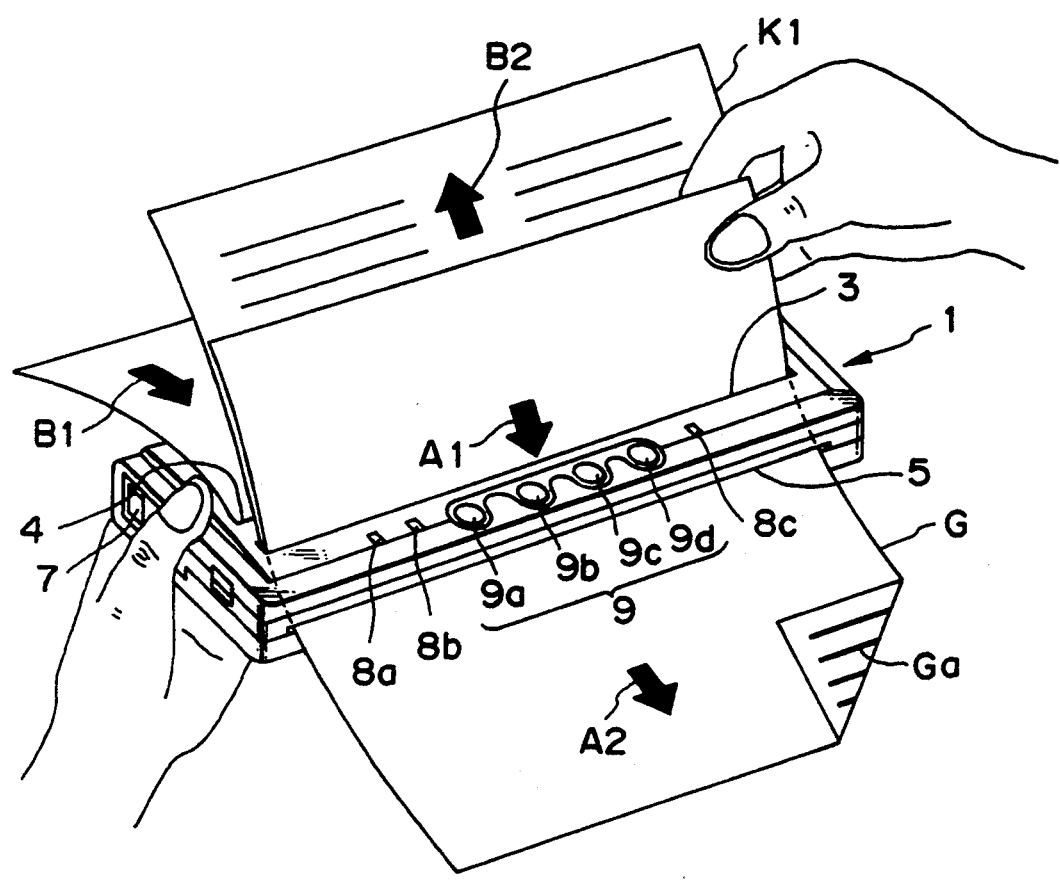
FIG. 1B is a perspective view showing the outer appearance of the facsimile apparatus according to the first embodiment in a used state.

Embodiments of the present invention will be described in detail below with reference to the accompanying drawings. FIG. 1A is a perspective view showing the outer appearance of a portable facsimile apparatus 1 according to the first embodiment of the present invention, which apparatus is in a state wherein neither an original nor a recording sheet are set. FIG. 1B is a perspective view showing the outer appearance of the portable facsimile apparatus 1 in a state wherein an original G and a recording sheet K1 are set and are conveyed in directions of arrows, respectively.

Referring to FIG. 1A, a housing cover 2 is a resin cover member which is formed by resin injection molding such that the cover clan be separated into upper and lower parts. The housing cover 2 has small outer dimensions, i.e., a width of 300 mm, a depth of 110 mm, and a height of 32 mm, such that the apparatus can be easily stored in an ordinary business bag. In addition, the apparatus incorporates a battery power supply and a facsimile function (both will be described later). Therefore, if only this portable facsimile apparatus is connected to a predetermined telephone line, the apparatus can be used in any place, e.g., outdoors and in an automobile. That is, the apparatus can be used as a so-called portable facsimile apparatus. Furthermore, the apparatus can satisfy demand for a reduction in the size of a facsimile apparatus.

As shown in FIG. 1A, first and second opening portions 3 and 4 are formed in the upper surface of the housing cover 2 of the portable facsimile apparatus 1 having the above-men-ioned outer dimensions. The first opening portion 3 has a longitudinal size allowing an original having a width equal to that of a B4 size sheet to be inserted therein. The second opening portion 4 similarly has a longitudinal size allowing a recording sheet having a width equal to that of a B4 size sheet to be inserted therein. In addition, a discharge port 5 is formed in the front surface of the housing cover 2 so as to allow a B4 size original to be discharged therefrom.

An operation switch section 9 is arranged near an edge portion on the upper surface of the housing cover 2. The operation switch section 9 includes a fine/normal mode setting switch 9a, a copy/field mode setting switch 9b, a stop switch 9c, and a start switch 9d for starting a transmission mode in the presence of a sheet, and a reception mode in the absence of a sheet. An LED 8c for displaying a power ON state is arranged on the right side of the operation switch section 9, while an LED 8a for displaying an operation error and an LED 8b for displaying a fine mode set state are arranged on the left side of the operation switch section 9. These LEDs are arranged almost in a line. A power switch 7 and an external connector 6 for connection with a telephone are arranged on the left side surface of the portable facsimile apparatus 1.

In the portable facsimile apparatus 1 having the above-described arrangement, as shown in FIG. 1B, an original G is inserted, with an image surface Ga facing down, through the first opening portion 3 in the direction indicated by an arrow A1, and is discharged outside through the discharge port 5 in the direction indicated by an arrow A2. On the other hand, a cut sheet K1 consisting of thermal recording paper is inserted through the second opening portion 4 in the direction indicated by an arrow B1, and is discharged from the first opening portion 3 in the direction indicated by an arrow B2 (upward). With this arrangement, an original reading operation and a recording operation in the facsimile apparatus can be performed in units of cut sheets.

When the portable facsimile apparatus 1, which is formed into a flat, compact structure in the above-described manner, is to be used, for example, the apparatus is held in one hand of a user, and originals are inserted one by one with the other hand. In the reception mode, reception can be performed by setting only a thermal recording cut sheet K1 through the second opening portion 4. In the copy mode, by simultaneously setting the original G and the cut sheet K1, copies can be made one by one without making line connection.

The internal arrangement of the apparatus will be described next with reference to FIG. 2. FIG. 2 is a cross-sectional view taken along a plane crossing one of the switches constituting the operation switch section 9 of the portable facsimile apparatus 1 shown in FIGS. 1A and 1B, illustrating the arrangement of the main part inside the apparatus. Referring to FIG. 2, the abovedescribed housing cover 2 is constituted by a cover bottom plate 10a, a cover upper plate 10c, a cover front plate 10b, a battery storage portion 10d, and the like in the form of a box, in which the respective components can be incorporated. The first and second opening portions 3 and 4 are formed in the cover upper plate 10c, as shown in FIG. 2, while the discharge port 5 is formed almost at the center of the cover front plate 10b. In addition, a switch cover 21 also having a display function covers the operation switch section 9.

The arrangement of the original reading section will be described below. A CS roller 13 as a first biasing roller serves to bring the original G into tight contact with the original reading portion of a contact sensor 12 to obtain a frictional force, thus conveying the original G. The CS roller 13 is pivotally supported on both sides of a sheet metal base 18 which is bent upward.

In the arrangement in which the outer surface of the CS roller 13 is always set in a biased state with respect to the reading portion of the contact sensor 12, the contact sensor 12 is fixed to a sensor base plate 16 swingably supported on the sheet metal base 18. The integral structure constituted by the sensor base plate 16 and the contact sensor 12 is always biased against the CS roller 13 by a spring 17 having one end fixed to a stud 18e integrally formed on the sheet metal base 18. The sensor base plate 16 has a cross-sectional shape shown in FIG. 2. More specifically, the sensor base plate 16 guides the original G, and has a sharp distal end portion 16e and also has a portion extending along the outer surface of a TPH roller 15 of the recording section (to be described above). With this structure, a cut sheet is guided to the first opening portion 3, and paper can be cut with the distal end portion 16e.

The arrangement. of the recording section will be described below. The TPH roller 15 as the second biasing roller for conveying the thermal recording cut sheet K1 is pivotally supported on the sheet metal base 18. The TPH roller 15 brings the cut sheet K1 into tight contact with the recording portion of a line thermal head 14 to obtain a frictional force, thus conveying the cut sheet K1. In order to set such a tight contact state, the outer surface of the TPH roller 15 is always set in a biased state with respect to the recording portion of the line thermal head 14. In order to set this state, the line thermal head 14 is fixed to a thermal head board 19, as shown in FIG. 2. More specifically, the thermal head board 19 is swingably held between studs 10f and 10e through a hole 19a formed in the board 19 so as not to be slipped off. The stud 10f extends from the inner surface of the second opening portion 4. The stud 10e extends upright from the cover bottom plate 10a. The thermal head board 19 is biased by a coil spring 20 held between the lower surface of the board 19 and the sheet metal base 18 in a compressed state, thereby always biasing the recording portion of the line thermal head 14 against the TPH roller 15.

In order to drive the CS roller 13 and the TPH roller 15 while they are kept in a biased state, the coefficient of friction of each roller with respect to the reading portion of the contact sensor 12 or the recording portion of the line thermal head 14 may be set to be smaller than that of each roller with respect to an original or a recording sheet. Therefore, a special material is used for the outer surfaces of the CS roller 13 and the TPH roller 15 instead of a rubber material. In this way, an original convey path for an original and a sheet convey path for the recording sheet are constructed.

An electronic board for executing the facsimile function is constituted by a chip board 28 and a discrete board 26 which are respectively arranged along the upper and lower inner surfaces of the housing cover 2, as shown in FIG. 2. The chip board 28 has LSI chips, IC chips, chip parts, and the like mounted on its surface. On the discrete board 26, resistors, capacitors, diodes, and the like are mounted through a reflow solder bath. Connection of this electronic board is made through a connector board 27. With this arrangement, the manufacturing process of each board can be simplified, and the storage space for the electronic board can be efficiently ensured in accordance with a reduction in the size of the apparatus.

A rechargeable battery 11 is stored in the above-mentioned battery storage portion 10d to be detachable in the directions indicated by arrows D1 and D2 in FIG. 2. As this rechargeable battery 11, for example, a nickel-cadmium battery capable of generating high power can be used.

In the above-described arrangement, as shown in FIG. 1B, when the original G is inserted, with the image surface Ga facing down, through the first opening portion 3 in the direction indicated by the arrow A1, a predetermined reading operation is performed at the reading section. Thereafter, the original G is discharged outside (in the direction indicated by the arrow A2) through the discharge port 5. On the other hand, when the thermal recording cut sheet K1 is inserted through the second opening portion 4 in the direction indicated by the arrow B1, a predetermined recording operation is performed at the recording section. Thereafter, the cut sheet K1 is discharged from the first opening portion 3 in the direction indicated by the arrcw B2 (upward). In this manner, an original reading operation and a recording operation in the facsimile apparatus can be performed in units of cut sheets.

FIG. 3 is a cross-sectional view showing a portable facsimile apparatus according to the second embodiment of the present invention. Since the arrangements of the reading and recording sections of the second embodiment are almost the same as those of the first embodiment described above, only different portions will be described below. Referring to FIG. 3, a cover battery storage portion 10d is formed to be continuous with the upper and lower surfaces of the housing so as to allow a rechargeable battery 11 to be detachable in the directions indicated by arrows D3 and D4. In addition, a chip board 28 and a chip board 28 are disposed through a spacer to form a two-story structure, as shown in FIG. 3.

In the above arrangement, similar to the first embodiment, as shown in FIG. 1B, when an original G is inserted, with an image surface Ga facing down, through a first opening portion 3 in the direction indicated by the arrow A1, a predetermined reading operation is performed at the reading section. Thereafter, the original G is discharged outside (in the direction indicated by the arrow A2) through a discharge port 5. On the other hand, when a thermal recording cut sheet K1 is inserted through a second opening portion 4 in the direction indicated by the arrow B1, a predetermined recording operation is performed at the recording section. Thereafter, the cut sheet K1 is discharged from the first opening portion 3 in the direction indicated by the arrow B2 (upward). In this manner, an original reading operation and a recording operation in the facsimile apparatus can be performed in units of cut sheets.

Figure 4:
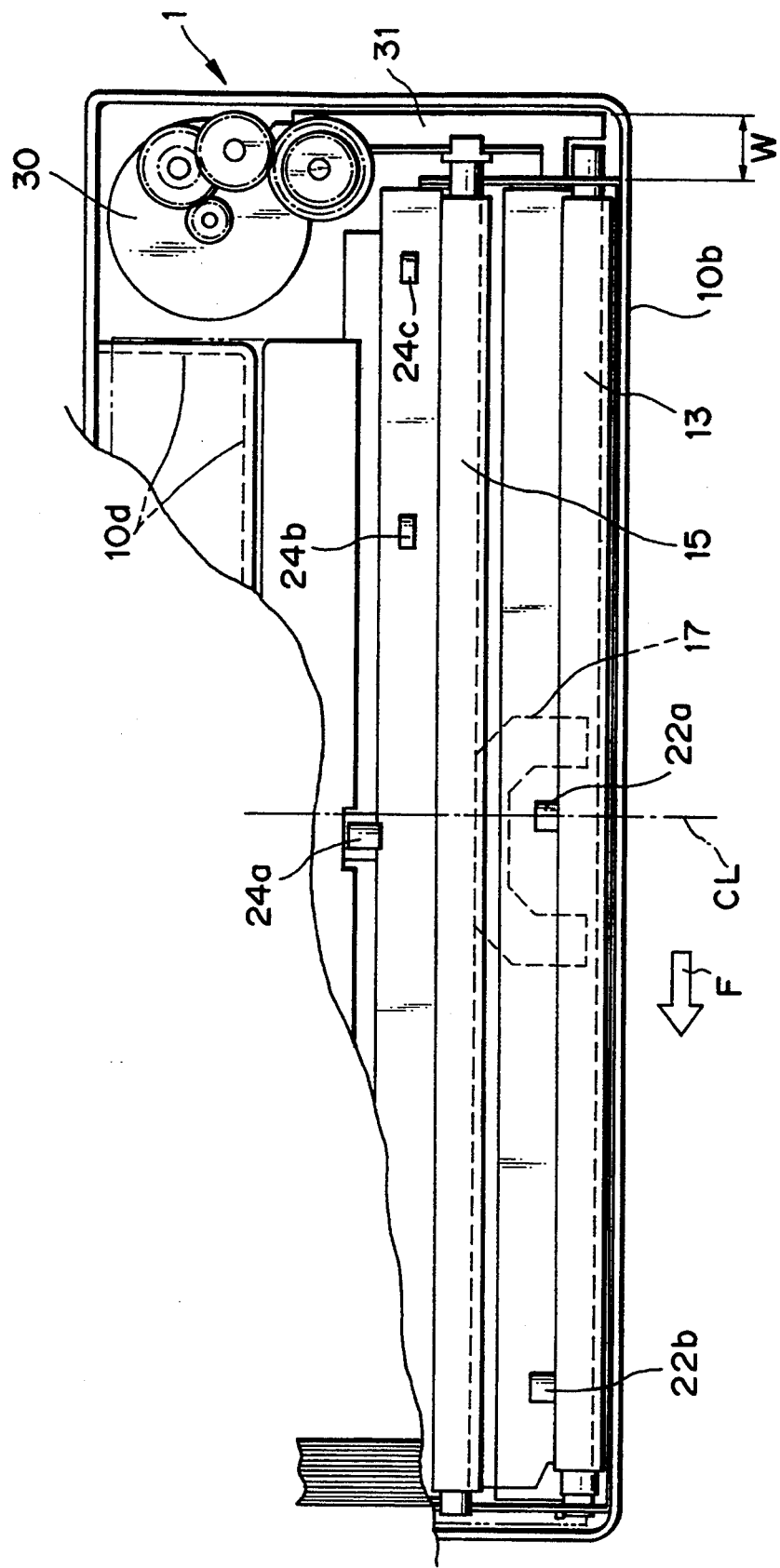
FIG. 4 is a plan view of the low-profile facsimile apparatus according to the first and second embodiments.

FIG. 4 is a plan view of a portable facsimile apparatus 1 in a state wherein the reading section and the recording section are offset to the left (in the direction indicated by an arrow F) with respect to a central line CL of the apparatus. The reading and recording sections will be described below with reference to the locations of a CS roller 13 and a TPH roller 15 in FIG. 4. The central positions of the rollers 13 and 15 in their longitudinal directions are offset to the left (the direction indicated by the arrow F in FIG. 4) with respect to the central line CL so as to ensure a space having a width W in the housing of the apparatus. A gear train 31 is disposed in this space to allow transmission of the driving force of a pulse motor 30 as a driving source for each roller.

DES sensors 22a and 22b for respectively detecting the presence/absence of originals having different sizes, and RPS sensors 24a, 24b, and 24c for respectively detecting the presence/absence of recording sheets having different sizes are respectively arranged in the reading and recording sections at the respective positions shown in FIG. 4.

Figure 5:
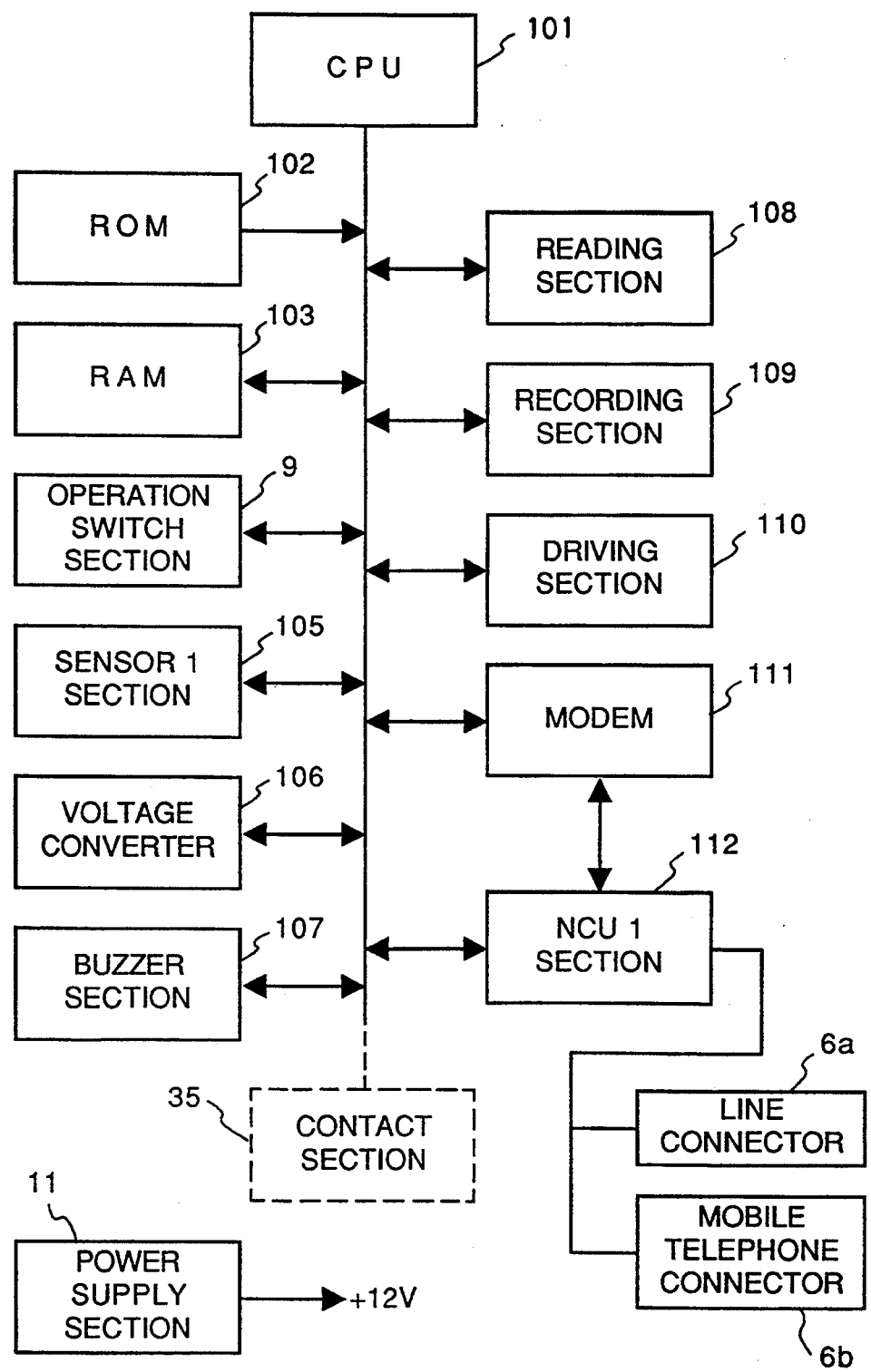
FIG. 5 is a block diagram of the low-profile facsimile apparatus according to the first and second embodiments.

FIG. 5 is a block diagram of the portable facsimile apparatus 1. Referring to FIG. 5, the following components are connected to a CPU 101: a ROM 102, a RAM 103, an operation switch section 9, a sensor 1 section 105 constituted by the above-mentioned DES sensors 22 and the RPS sensors 24, a voltage converter 106 for obtaining a voltage of 5 V from a single power supply voltage (12 V) applied from the rechargeable battery 11, a buzzer section 107 for informing an operation/action state, a reading section 108 for processing a read signal from a contact sensor 12, a recording section 109 for outputting a recording signal by using a line thermal head 14, a driving section 110 for driving the pulse motor 30 in a predetermined manner, a MODEM 111 for converting a line signal, and an NCU 1 section 112 connected to a line connector 6a or a mobile telephone connector 6b.

A contact section 35 indicated by the broken line in FIG. 5 is a connection for external connection, which is used to add a function to the portable facsimile apparatus 1 described above. The contact section 35 is arranged on the connector board 27.

Figure 6:
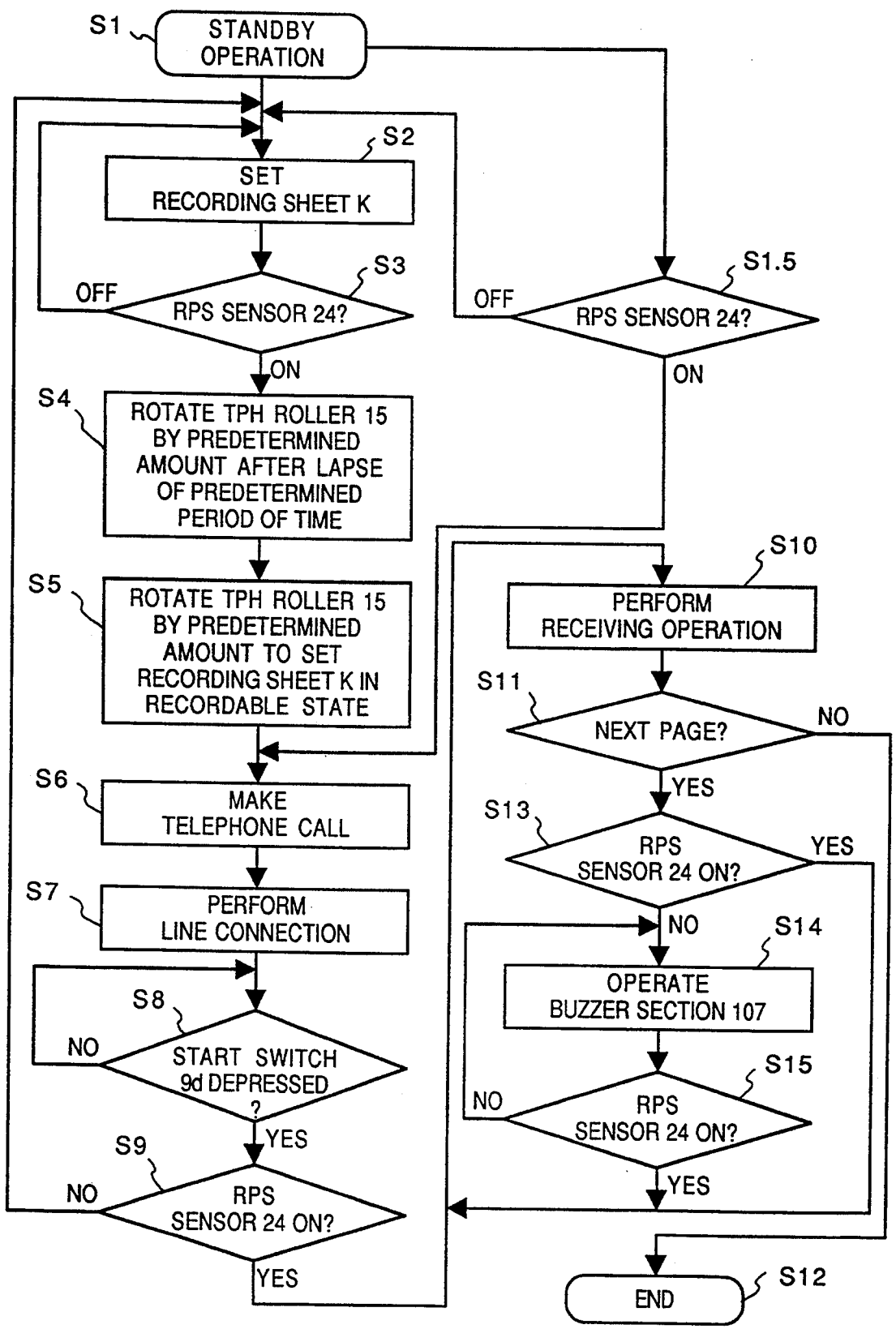
FIG. 6 is a flow chart showing a reception mode.
Figure 7:
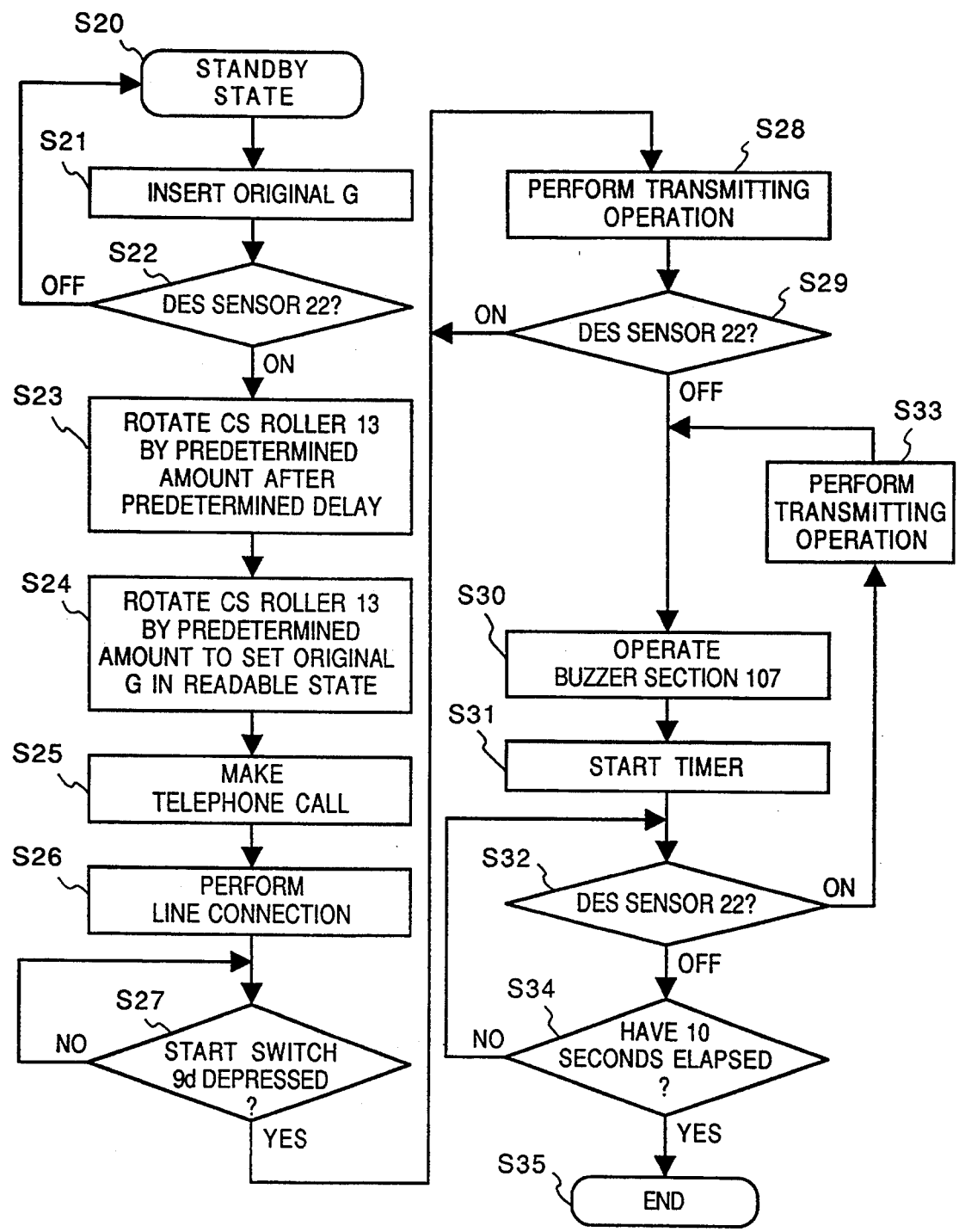
FIG. 7 is a flow chart showing a transmission mode.

Operations of the apparatus having the above arrangement in the reception and transmission modes will be described below with reference to the flow charts shown in FIGS. 6 and 7. Referring to FIG. 6, when the start switch 9d is depressed, a standby state is set in step S1 to wait for a receiving operation. Following the step S1, in order to examine if the recording sheet K is already inserted or not the flow advances to step S1.5. In step S1.5, if RPS sensors 24 is off state because the recording sheet K is not inserted, then the flow advances to step 2, and if RPS sensors 24 is on state because the recording sheet K is already inserted then the flow advances to step S6. The flow then advances to step S2 to set a recording sheet K (the cut sheet K1 or the roll paper K2). If it is determined in step S3 that the RPS sensor 24 is turned on upon detection of the presence of the recording sheet K, the flow advances to step S4 to pivot the TPH roller 15 by a predetermined amount after a lapse of a predetermined period of time so as to bring the leading end portion of the recording sheet K into the gap between the TPH roller 15 and the line thermal head 14, thereby eliminating any skew of the recording sheet K.

In step S5, the TPH roller 15 is pivoted by a predetermined amount to set the recording sheet K in a recordable state. In step S6, a telephone call is made with respect to the transmitting end. In step S7, line connection is performed. In step S8, the start switch 9d is depressed. Thereafter, the flow advances to step S9 to check the presence/absence of the recording sheet K again by using the RPS sensor 24. If the RPS sensor 24 is turned on, a reception operation is started in step S10, and a recording operation is completed. The flow then advances tc, step S11 to check the presence/absence of the next page from the transmitting end. If NO in step S11, the receiving operation is ended (step S12).

If YES in step S11, the flow advances to step S13 to wait for the second recording sheet K to be set. If the RPS sensor 24 is turned on upon detection of the presence of the recording sheet K, the flow advances to step S10 to execute a receiving operation. If it is determined in step S13 that the RPS sensor 24 is not turned on after a lapse of a predetermined period of time, the flow advances to step S14 to operate the buzzer section 107 so as to urge the user to set a recording sheet K. If the recording sheet K is set, and it is determined in step S15 that the RPS sensor 24 is turned on, the flow advances to step S10 to execute a receiving operation. Subsequently, a similar operation is repeated to perform reception of a predetermined number of pages.

An operation in the transmission mode will be described next with reference to the flow chart shown in FIG. 7. When the start switch 9d is depressed, a standby state is set in step S20 to wait for a transmitting operation. The flow then advances to step S21 to set an original G. If it is determined in step S22 that the DES sensor 22 is turned on upon detection of the presence of the original G, the flow advances to step S23 to pivot the CS roller 13 by a predetermined amount after a lapse of a predetermined period of time to bring the leading end portion of the original G into the gap between the CS roller 13 and the contact sensor 12, thereby eliminating/correcting any skew of the original G.

In step S24, the CS roller 13 is pivoted by a predetermined amount to set the original G in a readable state. In step S25, a telephone call is made with respect to the receiving end. In step S26, line connection is performed. In step S27, the start switch 9d is depressed. Thereafter, the flow advances to step S28 to start a transmitting operation. In step S29, the presence/absence of the trailing end portion of the original G is checked. If NO in step S29, the transmitting operation is ended (step S29).

After the transmitting operation, the flow advances to step S30 to operate the buzzer section 107 so as to urge the user to set the next original G. The flow then advances to step S31 to start an internal timer. If it is determined in step S32 that the DES sensor 22 is turned on, the flow advances to step S33 to execute a transmitting operation. In contrast to this, if the OFF state of the DES sensor 22 continues for 10 seconds in step S34, the absence of the next original is determined. The processing is then ended in step S35.

Figure 8:
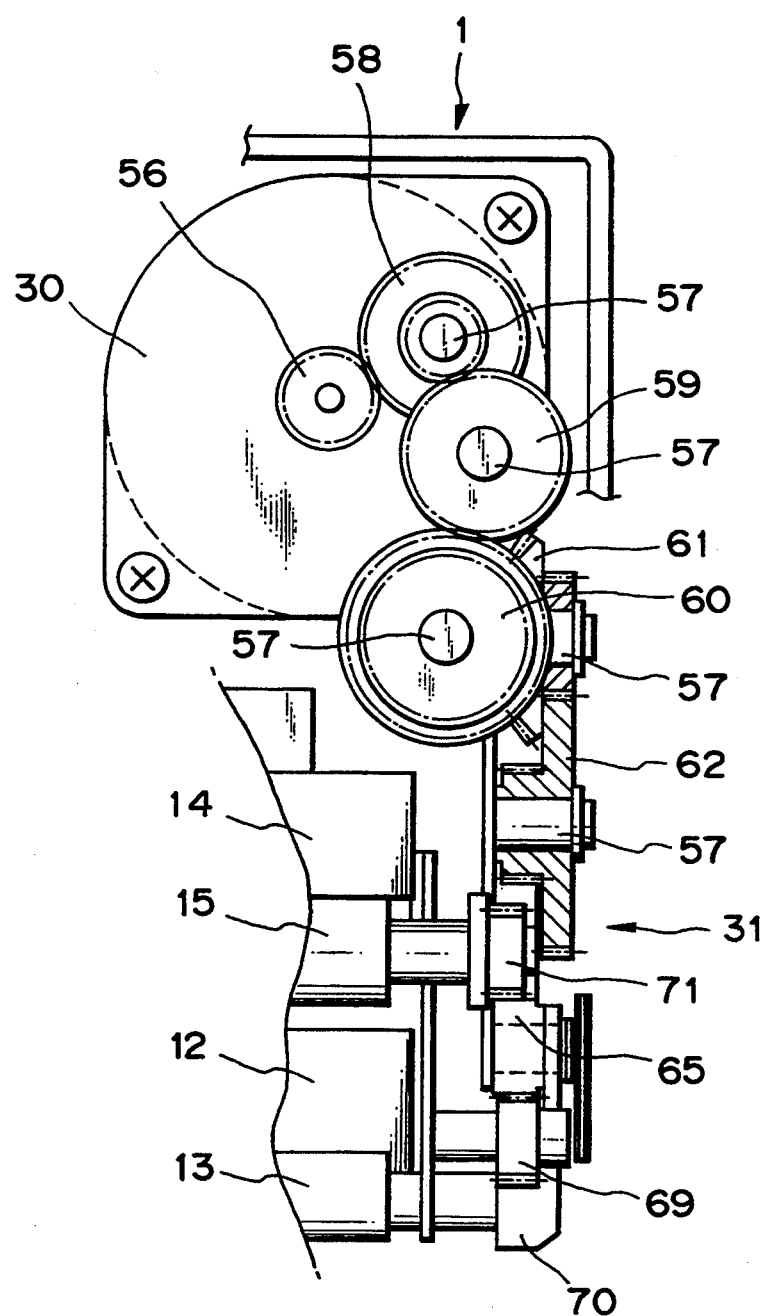
FIG. 8 is a partially enlarged plan view showing the arrangement of a driving mechanism for each roller.

FIG. 8 is a partially enlarged plan view showing the arrangement of a driving mechanism for each roller. Referring to FIG. 8, the pulse motor 30 as a driving means is reversible, as is generally known, and an output gear 56 is arranged on the output shaft of the motor 30 to be almost perpendicular to the direction of height of the facsimile apparatus main body. A first gear 58 pivotally supported by a stud 57 is meshed with the output gear 56. The first gear 58, a second gear 59, and a horizontal bevel gear 60 are sequentially meshed with each other to transmit the power of the output gear 56 in the horizontal direction (with respect to the apparatus). A vertical bevel gear 61, which is supported by a stud 57 to be pivotal in the vertical direction (with respect to the apparatus), is meshed with the horizontal bevel gear 60 to change the output direction of the driving means.

Figure 9:
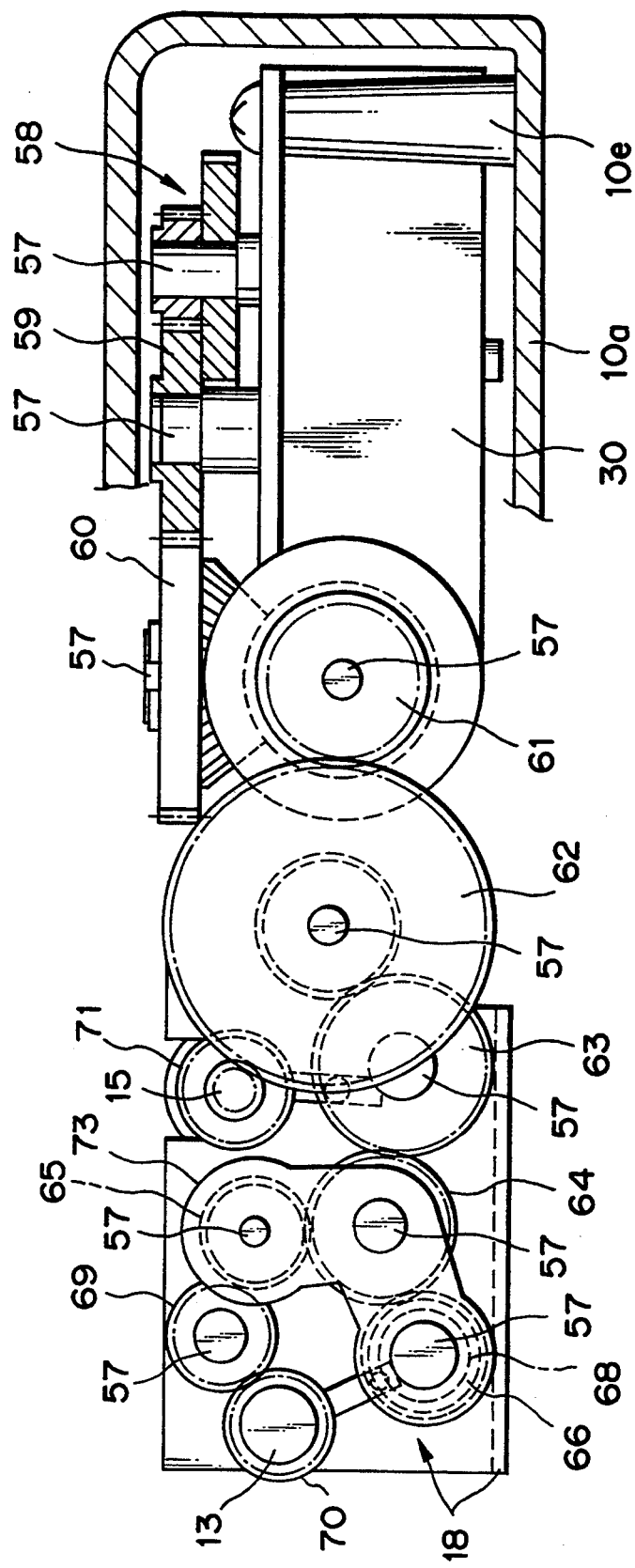
FIG. 9 is a partially enlarged side view showing the arrangement of a driving mechanism for each roller.

FIG. 9 is a partially enlarged side view showing the arrangement of the driving mechanism for each roller in FIG. 8. Referring to FIG. 9, a third gear 62 pivotally supported by a stud 57 is meshed with the vertical bevel gear 61. A fourth gear 63 pivotally supported by a stud 57 is further meshed with the third gear 62.

A swing mechanism is arranged midway along the power transmission mechanism having the above-described manner. The swing mechanism serves to set a state in which only the CS roller 13 as the first biasing roller is driven in a predetermined direction when the pulse motor 30 is rotated in one direction, and a state in which both the CS roller 13 and the TPH roller 15 as the second biasing roller are driven in a predetermined direction when the pulse motor 30 is rotated in the other direction. The swing mechanism is designed such that a sun gear 64 is always meshed with the forth gear 63, and is supported by a stud 57 extending upright from a side surface of the sheet metal base 18 to be pivotal together with a bracket 73. Two studs 57 are formed on this bracket 73 which axially supports first and second planetary gears 65 and 66 meshed with the sun gear 64, respectively. A wave washer 68 indicated by a broken line in FIG. 9 is inserted between the second planetary gear 66 and the bracket 73 to generate a pivoting force for pivoting the bracket 73 clockwise.

A TPH roller gear 71 is fixed to one end of the TPH roller 15. A CS roller gear 70 is fixed to one end of the CS roller 13. An intermediate gear 69 pivotally supported by a stud 57 extending upright from a side surface of the sheet metal base 18 is always meshed with the CS roller gear 70 so that the respective rollers in a meshed state after a swinging operation of the swing mechanism can be rotated in the same direction.

Figure 10A:
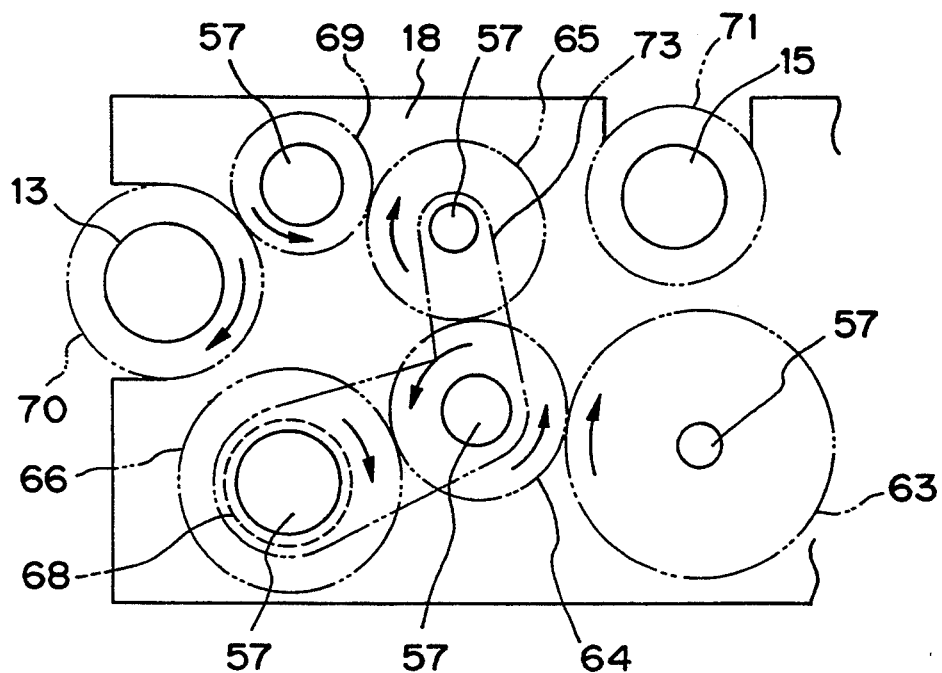
FIG. 10A is a view for explaining an operation of a swing mechanism in a case wherein a pulse motor is driven in the forward direction.
Figure 10B:
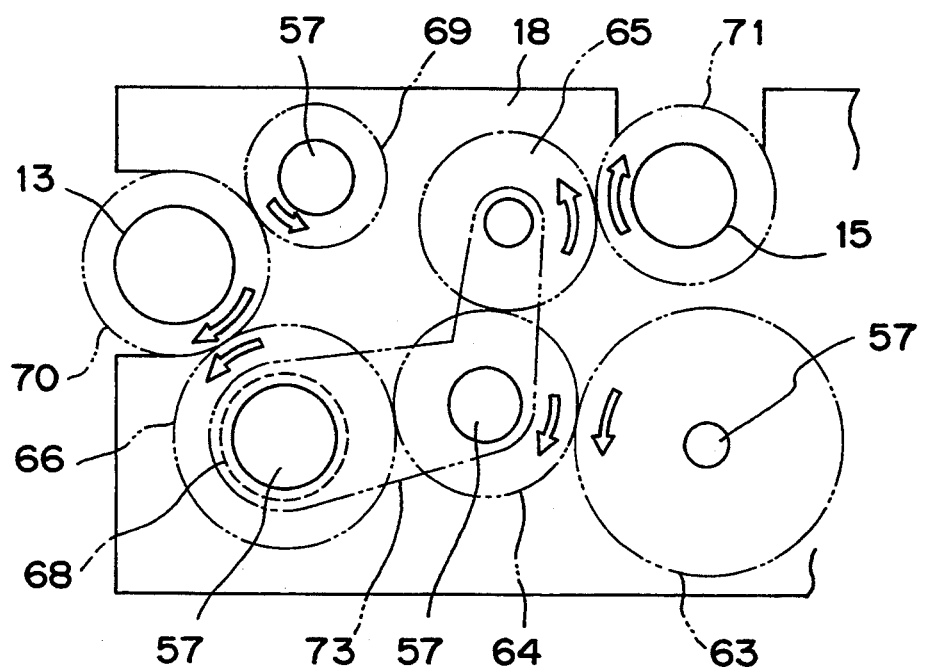
FIG. 10B is a view for explaining an operation of the swing mechanism in a case wherein a pulse motor is driven in the reverse direction.

The above power transmission and swing mechanisms will be described below with reference to FIGS. 10A and 10B showing operations. FIG. 10A is a side view showing a case wherein the pulse motor is driven in the forward direction. FIG. 10B is a side view showing a case wherein the pulse motor is driven in the reverse direction. In FIGS. 10A and 10B, the pitch diameter of each gear is indicated by an alternate long and short dashed line.

Referring to FIG. 10A, the fourth gear 63 is driven in a direction of an arrow, and the sun gear 64 meshed therewith is driven in a direction of an arrow. As a result, the planetary gears 65 and 66 axially supported by the bracket 73 are also pivoted, and a pivoting force is generated in the bracket 73 in the counterclockwise direction owing to the frictional action of the above wave washer 68, thereby causing the first planetary gear 65 to mesh with the intermediate gear 69. As a result, the CS roller gear 70 meshed with the intermediate gear 69 is driven in a direction of an arrow in FIG. 9 so as to drive the CS roller 13 in a direction of an arrow.

Referring to FIG. 10B, the fourth gear 63 is driven in a direction of a double arrow, and the sun gear 64 meshed therewith is driven in a direction of a double arrow. As a result, the planetary gears 65 and 66 axially supported by the bracket 73 are also pivoted, and a pivoting force is generated in the bracket 73 in the clockwise direction owing to the frictional action of the wave washer 68 described above. As a result, the first planetary gear 65 is disengaged from the intermediate gear 69 and is meshed with the TPH roller gear 71. In addition, the second planetary gear 66 is meshed with the CS roller gear 70 from below to drive the CS roller gear 70 in a direction of a double arrow in FIG. 10B.

With the above-described operation, the respective biasing rollers can be selectively driven by only changing the driving direction of the single pulse motor 30.

Therefore, the power consumption can be reduced. In addition, the nusuper of components can be decreased, thereby realizing a reduction in cost.

According to the above-described facsimile apparatus, a cut sheet can be used, and a compact, flat structure can be realized. In addition, a common driving source is used for both an original and a recording sheet to reduce the power consumption, and the number of components can be decreased, thereby providing a low-profile facsimile apparatus which allows a reduction in cost.

The present invention is not limited to the above embodiments and various changes and modifications can be made within the spirit and scope of the present invention. Therefore, to apprise the public of the scope of the present invention the following claims are made.

What is claimed is:

1. A portable facsimile apparatus comprising:
   a housing constituting an outer surface of said portable facsimile apparatus;
   a first openg portion formed in a front portion of a upper surface of said housing, said first opening prtion provided to insert an original;
   a front surface opening portion formed in a front surface of said housing;
   an original reading section for reading an original while conveying said origial between said first opening portion and said front surface opening portion, said original reading section being arranged on a front portion of said housing;
   a second opening portion formed in the upper surface of said housing at a position closer to a rear side than said first opening portion, said second opening portion being provided to insert a recording sheet from outside of said housing;
   a recording section for recording onto a recording section while inserting said recording sheet through said second opening portion and said first opening portion, said recording section being arranged close to said original reading section in said housing; and
   a battery storage portion for a battery that drives said original reading section and said recording section, said battery storage portion being arranged at a rear portion of said recording section, thus forming said housing both flat and compact.

2. An apparatus according to claim 1, wherein said housing is formed into a flat, compact structre.

3. An apparatus according to claim 1, wherein said original reading section comprises a contact line image sensor and a first convey roller which is pivoted/driven while said contact line image sensor is biased thereagainst, and
   said recording section comprises a line thermal head and a second convey roller which is pivoted/-driven while said line thermal head is biased thereagainst, in order to use a thermal recording sheet as the recording sheet.

4. An apparatus according to claim 3, wherein said first and second convey rollers are arranged at almost the same level in said housing, and said contact line image sensor and said line thermal head are arranged to be biased toward the upper surface of said housing, thereby setting said first and second convey rollers in a biased state.

5. An apparatus according to claim 3, wherein an original convey path for an original and a sheet convey path for the thermal recording sheet are arranged between said line thermal head and said contact line image sensor to be adjacent to each other so as to convey the original and the thermal recording sheet from the first opening portion.

6. An apparatus according to claim 3, wherein driving power for said first and second convey rollers is obtained from common driving means.

7. An apparatus according to claim 3, wherein said original reading section and said recording section are offset toward one side surface of said housing to ensure a space, thereby allowing storage of a drive/transmission system of said driving source.

8. A portable facsimile apparatus comprising:
   a housing constituting an outer surface of said portable facsimile apparatus;
   an original insert port formed in an upper surface of said housing;
   an original discharge port formed in a front surface of said housing;
   an original reading section for conveying an original between said original insert port and said original discharge port, said original reading section being arranged on a front portion of said housing;
   a recording sheet insert port formed in the upper surface of said housinq at a position closer to a rear side than said original insert port, said original insert port being provided to insert a recordinq sheet from outside of said housing;
   a recording sheet discharge port formed in an upper surface of said housing, being arranged close to said original insert port;
   a recording section for inserting said recording sheet through said recording sheet insert port and said recording sheet discharge port, and said recording section is arranged close to said original reading section in said housinq
   a battery storage portion for a battery that drives said original reading section and said recording section, said battery storage portion being arranged at a rear portion of said recording section, thus forming said housing compact.

9. An apparatus according to claim 8, wherein said original reading section comprises a contact line image sensor and a first convey roller which is pivoted/driven while said contact line image sensor is biased thereagainst,
   said recording section comprises a line thermal head and a second convey roller which is pivoted/-driven while said line thermal head is biased thereagainst, in order to use a thermal recording sheet as the recording sheet, and
   driving power for said first and second convey rollers is obtained from common driving means which receives power supplied from said battery.

10. An apparatus according to claim 8, wherein said original reading section and said recording section are offset toward one side surface of said housing to ensure a space, thereby allowing storage of a drive/transmission system of said driving source.

11. An apparatus according to claim 8, wherein a flat, elongated rechargeable secondary battery is used as said battery.

12. A portable facsimile apparatus comprising:
    a housing constituting a flat outer surface of said portable facsimile apparatus;
    an oriqinal insert port formed in one flat surface of said housing;

an original discharge port formed in a side surface of said housing;

an original reading section for conveying an original between said original insert port and said original discharge port, said original reading section being arranged at one side portion of said housing, having both a reading head and a first convey roller a recording sheet insert port formed in said one flat surface of said housing at a position closer to a rear side than said original insert port, said recording sheet insert port provided to insert a recording sheet from outside of said housing;

a recording sheet discharge portion formed in said flat surface of said housing and arranged close to said original insert port;

a recording section for inserting said recording sheet through said recording sheet insert port and said recording sheet discharge port, said recording section being arranged close to said original reading section in said housing, and having both a recording head and a second convey roller;

driving means for driving said first roller and said second roller, and arranged at another side portion of said housing;

a battery storage portion for a battery that drives said reading head, said recording head and said driving means, said battery storage portion being arranged at a rear portion of said recording section together with said driving means, thus forming said housing compact.

13. An apparatus according to claim 12, wherein a flat pulse motor for generating a high torque is used as said driving means, and an axial direction of an output shaft of said pulse motor is set to be almost perpendicular to an upper surface of said housing so as to transmit power to a power transmission mechanism by changing a direction of the output shaft.

14. A facsimile apparatus comprising:

a housing constituting an outer surface of said facsimile apparatus;

an original reading section for conveying an original between a first opening portion formed in a front portion of an upper surface of said housing and a front surface opening portion formed in a front surface of said housing; and a recording section for inserting a recording sheet through a second opening portion formed in the upper surface of said housing at a position closer to a rear side than the first opening portion and for discharging the recording sheet through the first opening portion, wherein a reversible motor is used as said driving means, and a power transmitting section is arranged midway along a power transmission mechanism for said first convey roller, said power transmitting section driving one of said first and second rollers when said motor is driven in one direction, and driving both of said first and second convey rollers when said motor is rotated in a reverse direction, and wherein said power transmitting section comprises a swing mechanism meshed with said first and second biasing rollers to drive both thereof.

15. A portable facsimile apparatus comprising:

a housing constituting an outer surface of said facsimile apparatus;

a first opening portion, formed in a front portion of an upper surface of said housing, provided to insert an original;

a front surface opening portion formed in a front surface of said housing;

an original reading section for conveying an original between said first opening portion and said front surface opening portion, said original reading section being arranged on a front portion of said housing, having a contact line image sensor and a first convey roller which is pivoted/driven while said contact line image sensor is biased against said first convey roller; and a second opening portion formed in the upper surface of said housing at a position closer to a rear side than said first opening portion, said second opening portion being provided to insert a recording sheet from outside of said housing;

a recording section for inserting said recording sheet through said second opening portion and said first opening portion, said recording section being arranged close to said original reading section in said housing and having a line thermal head and a second convey roller, which is pivoted/driven while said line thermal head is biased against said second convey roller;

a recording section for inserting said recording sheet through said second opening portion and said first opening portion, said recording section being arranged close to said original reading section in said housing and having a line thermal head and a second convey roller which is pivoted/driven while said line thermal head is biased against said second convey roller;

a driving means for driving said first roller and said second roller, and arranged at the rear portion of said housing;

a battery storage portion for a battery that drives said contact image sensor, said line thermal head and said driving means, wherein said battery storage portion is arranged at rear portion of said recording section together with said driving means enabling said housing to be both flat and compact.

16. An apparatus according to claim 15, wherein said original reading section and said recording section are offset toward one side surface of said housing to ensure a space, thereby allowing storage of a drive/transmission system of said driving source.

17. An apparatus according to claim 15, wherein a flat, elongated rechargeable secondary battery is used as said battery.

18. A facsimile apparatus having at least a minimum function required for a facsimile apparatus, comprising:

a flat, compact housing constituting an outer surface of said facsimile apparatus;

an original reading section for conveying an original between a first. opening portion formed in a front portion of an upper surface of said housing and a front surface opening portion formed in a front surface of said housing; and a recording section for inserting recording sheet through a second opening portion formed in the upper surface of said housing at a position closer to a rear side than the first opening portion and for discharging the recording sheet through the first opening portion, wherein said original reading section is constituted by a contact line image sensor and a first convey roller which is pivoted/driven while said contact line image sensor is biased, said recording section is constituted by a line thermal head and a second convey roller which is pivoted/driven while said line thermal head is biased in order to use a thermal recording sheet as the recording sheet, and said apparatus further comprises a control section arranqed at a rear side of said recording section, and a storage portion for a battery detachably set through a side surface on the rear side of said housing, wherein a power transmitting section comprises a swing mechanism meshed. with said first and second biasing rollers to drive both thereof.

19. A portable facsimile apparatus according to claim 18, wherein a reversible motor is used as said driving means, and wherein the power transmitting section is arranged midway along a power transmission mechanism for said first convey roller, said power transmitting section driving one of said first and second rollers when said motor is driven in one direction, and both of said first and second convey rollers when said motor is driven in other direction.

* * * * *

UNITED STATES PATENT AND TRADEMARK OFFICE
CERTIFICATE OF CORRECTION

PATENT NO. : 5,379,121
DATED : January 3, 1995
INVENTOR(S) : MASAKATSU YAMADA, ET AL.

It is certified that error appears in the above-identified patent and that said Letters Patent is hereby corrected as shown below:

COLUMN 1

Line 10, "originall" should read --original--.

COLUMN 5

Line 1, "above-men-ioned" should read --above-mentioned--;
Line 56, "abovede-" should read --above-de- --.

COLUMN 8

Line 41, "is off" should read --are in an off--.
Line 43, "is on" should read --are in an on--.
Line 66, "tc," should read --to--.

COLUMN 11

Line 2, "nusuper" should read --number--.
Line 21, "openg" should read --opening-- and
    "a" (second occurrence) should read --an--.
Line 23, "prtion" should read --portion--.
Line 27, "origial" should read --original--.
Line 37, "section" should read --sheet--.
Line 48, "structre." should read --structure.--.

COLUMN 12

Line 25, "housinq" should read --housing--.
Line 27, "recordinq" should read --recording--.
Line 36, "housinq" should read --housing; and--.
Line 67, "oriqinal" should read --original--.

UNITED STATES PATENT AND TRADEMARK OFFICE
CERTIFICATE OF CORRECTION

PATENT NO. : 5,379,121
DATED : January 3, 1995
INVENTOR(S) : MASAKATSU YAMADA, ET AL.

It is certified that error appears in the above-identified patent and that said Letters Patent is hereby corrected as shown below:

COLUMN 13

Line 1, "oriqinal" should read --original-- and "discharqe" should read --discharge--.
Line 4, "oriqinal" should read --original--.
Line 5, "beinq" should read --being--.
Line 6, "arranqed" should read --arranged--; "housinq," should read --housing,--; and "havinq" should read --having--.
Line 7, "roller" should read --roller;--.
Line 15, "oriqinal" should read --original--.
Line 24, "housing;" should read --housing; and--.
Line 57, "drivinq" should read --driving--.

COLUMN 14

Line 2, "housinq," should read --housing,--.
Line 9, "beinq" should read --being-- and "arranqed" should read --arranged--.
Line 10, "havinq" should read --having-- and "imaqe" should read --image--.
Line 12, "imaqe" should read --image-- and "aqainst" should read --against--
Line 13, "and" should be deleted.
Line 14, "openinq" should read --opening--.
Line 15, "housinq" should read --housing--.
Line 17, "beinq" should read --being--.
Line 22, "ranqed" should read --ranged-- and "oriqinal" should read --original--.
Line 23, "havinq" should read --having--.
Line 30, "oriqinal" should read --original--, "readinq" should read --reading--.
Line 57, "first." should read --first--.
Line 61, "recording" (second occurrence) should read --the recording--.

UNITED STATES PATENT AND TRADEMARK OFFICE
CERTIFICATE OF CORRECTION

PATENT NO. : 5,379,121
DATED : January 3, 1995
INVENTOR(S) : MASAKATSU YAMADA, ET AL.

It is certified that error appears in the above-identified patent and that said Letters Patent is hereby corrected as shown below:

COLUMN 15

Line 9, "arranqed" should read --arranged--.

COLUMN 16

Line 2, "meshed." should read --meshed--.
Line 9, "rcllers" should read --rollers--.

Signed and Sealed this

Twenty-ninth Day of August, 1995

Attest:

BRUCE LEHMAN

Attesting Officer     Commissioner of Patents and Trademarks